Feb. 3, 1931.                F. W. NILSON                1,790,831
                                HOOK
                         Filed March 18, 1929

INVENTOR

Fred W. Nilson

Patented Feb. 3, 1931

1,790,831

UNITED STATES PATENT OFFICE

FRED W. NILSON, OF WORCESTER, MASSACHUSETTS, ASSIGNOR OF ONE-HALF TO NILS NILSON, OF WORCESTER, MASSACHUSETTS

HOOK

Application filed March 18, 1929. Serial No. 347,908.

This invention relates to hooks and more specifically to hooks having a locking tongue to insure a strong and secure connection.

It is an object of the present invention to provide a hook which may be used advantageously on anti-skid chains for automobiles and for similar purposes in which a hook is required to withstand adverse conditions.

Another object is to provide a hook which cannot be opened and released by pressure of ice and snow nor by the pinching or rubbing of an automobile tire upon it.

This invention also has for an object the provision of a hook which is readily attached and detached by a simple sliding operation of the locking tongue.

Another object is to increase the effective length of the locking tongue of a hook of the character described in a simple and effective manner whereby the strength and holding power are greatly increased.

These and other objects will be apparent to those skilled in the art as the detailed description of the invention proceeds.

In order to more completely understand the nature of the invention, attention is directed to the accompanying drawings in which.

Figure 1:
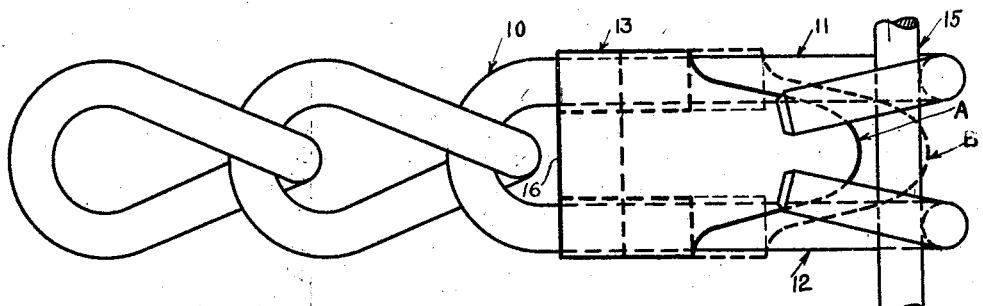
Fig. 1 is a plan view of one embodiment of the invention.
Figure 2:
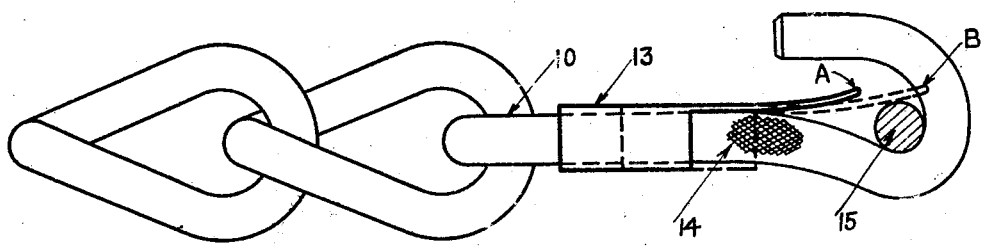
Fig. 2 is a side view of Fig. 1.

In Figs. 1 and 2 a hook 10 is shown having legs 11 and 12. Slidably secured over the legs 11 and 12 is a locking tongue or keeper 13 which is capable of being moved over the legs 11 and 12 from position A, shown in solid lines, to position B, shown in dotted lines. The tongue 13 is preferably made of tempered spring steel and is of such shape and size that it presents a friction fit over the legs 11 and 12. The tightness of the friction fit is such that the tongue will remain in any position of its movement until it is manually moved back into its original position.

The curvature 14 of the hook can be such that the tongue may slide partly over the curved portion and remain fixed in position. This construction has the effect of increasing the friction between the tongue and the hook and tends to hold the tongue more securely when it is moved over the curve.

The curvature 14 of the hook also tends to direct the extremity of the hook downward over an element 15 to which the hook is attached. The element 15 is a diagrammatic representation of one side of a link or other object to which the hook may be attached.

To increase the friction between the tongue and the hook, the bridge portion 16 of the tongue may be curved slightly upward or downward and shaped to exert a spring pressure on the legs 11 and 12 of the hook. This spring pressure may be directed outwardly against the insides of the legs 11 and 12 or it may be directed inwardly against the outside of the legs.

Also, to further increase the friction between the tongue and the hook, the legs 11 and 12 may diverge slightly so that they are spread farther apart toward the hooked end of the hook. If desired, the legs may converge toward the hooked end to produce the same effect. Either of these expedients may be used in combination with spring effect of the bridge portion 16, heretofore described, or any of the expedients mentioned may be resorted to separately. When the friction between the hook and the tongue is made sufficiently great the bridge portion of the hook need not be curved and the legs of the hook may be left straight.

To attach the hook to a link in another chain or to some other object, the tongue is slidably moved to the position A, in which position the link may readily slip between the tongue and the hook. The tongue snaps upward due to its spring action when the link has passed it, so that in order to remove the link again it is necessary to press downwardly on the tongue. After the hook has been attached in this manner the tongue 13 is moved manually to position B. When the tongue is in this position the extremity extends over the element to which it is attached so that now the element can not be removed by downward pressure on the tongue. Such pressure would only serve to move the tongue more closely to the element and hold it still more firmly. When the hook is used to connect cross chains of an anti-skid automobile chain to the side chains the tongue will be subjected to the pressure of the tire upon it and to the pressure of ice and snow. Such adverse conditions, instead of loosening the connection, serve to make the connection more secure as explained above. To release the connection it is only necessary to slide the tongue from position B to position A and then exert downward pressure on the tongue. Thus, it is seen that a very convenient and serviceable hook can be made in an extremely simple manner.

Figure 3:
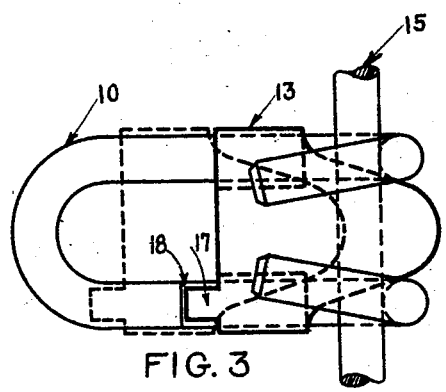
Fig. 3 is a plan view of a modification.
Figure 4:
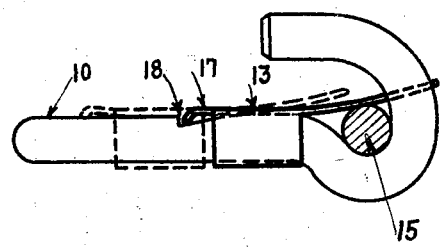
Fig. 4 is a side view of Fig. 3.

Coming now to the modification shown in Figs. 3 and 4, it will be noticed that the tongue here shown is identical with that shown in Figs. 1 and 2 except that the tongue is provided with a rearwardly extending spring catch 17 formed integrally with the tongue, and which is adapted, when the tongue is moved into holding position, to snap into a notch 18 in one of the legs of the hook. The object of this spring catch is to hold the tongue more securely. It is readily seen that the tongue cannot be released until catch 17 is lifted out of notch 18, which can be done, for example, by means of a screw driver or other simple tool and the tongue can then be moved backwardly and depressed as previously described in connection with Figs. 1 and 2.

The modification shown in Figs. 3 and 4 may or may not be provided with the friction means described heretofore. No friction means is required with this modification but under some circumstances it may be desirable, as when a doubly secure connection is wanted.

The spring catch 17 and the corresponding notch 18 on the hook can be placed on either one or both of the legs of the hook and it may be placed in any convenient position around the leg. It is desirable, of course, to have the catch in that position which is most easily and readily accessible so that the tongue may be more easily released.

In both embodiments shown the portion of the legs 11 and 12 of the hook on which the tongue bears may be milled or otherwise roughened to increase the friction between the elements. Other arrangements for increasing the friction between the elements which come within the scope of the present invention will be apparent to one skilled in the art to which this invention pertains.

While I have shown and described certain preferred embodiments of my invention, I do not wish to be limited thereto since the invention as defined in the appended claims can be embodied in a plurality of forms.

What I claim is:

1. A hook for cross chains of a non-skid automobile chain, said hook having a resilient locking tongue, said locking tongue being slidable on the hook from one position to a second position, said locking tongue being provided with means for retaining it in said second position, said means comprising a spring catch formed integrally with said tongue and a notch in the hook retaining said spring catch.

2. A hook for cross chains of a non-skid automobile chain, said hook having a resilient locking tongue, said locking tongue being slidable on the hook from one position to a second position, said locking tongue being provided with retaining means for retaining it in said second position, said retaining means comprising friction means and a spring catch formed integrally with said tongue and a notch in said hook retaining said spring catch.

3. A hook for cross chains of a non-skid automobile chain, said hook having a resilient locking tongue, said locking tongue being slidable on the hook from one position to a second position, said tongue being adapted to be retained in said second position by retaining means, said retaining means comprising convergence of the sides of that portion of the hook on which the locking tongue is mounted and a spring catch formed integrally with said tongue and a notch in said hook cooperating with said catch.

4. A hook for cross chains of a non-skid automobile chain, said hook having a resilient locking tongue of tempered spring steel, said locking tongue being slidable on the hook from one position to a second position, said tongue being adapted to be retained in said second position by friction means, said friction means comprising spring pressure exerted by said tongue upon that portion of the body of the hook on which the hook is mounted and additional means for retaining said hook in said second position comprising a spring catch formed integrally with said locking tongue and a notch in said hook cooperating with said catch.

5. A hook for cross chains of a non-skid automobile chain, said hook having a resilient locking tongue of tempered spring steel, said locking tongue being slidable on the hook from one position to a second position, said tongue adapted to be retained in said second position by friction means, said friction means comprising spring pressure exerted by the tongue upon the sides of the hook, said sides converging slightly and said sides being milled to further increase the friction and additional retaining means comprising a spring catch formed integrally with said locking tongue and a notch in said hook cooperating with said spring catch.

6. A hook for cross chains of a non-skid tire chain, said hook being adapted to be attached to a link of a side chain, said hook being provided with a keeper, said keeper being slidable on the hook from one position to a second position, said keeper being freely depressible when in said first position to allow insertion or withdrawal of said link in said side chain and said keeper overlapping the attached side of said link when in said second position whereby said overlapping by the keeper prevents depression of said keeper.

7. A hook for cross chains of a non-skid tire chain, said hook being adapted to be attached to a link of a side chain, said hook being provided with a keeper, said keeper being slidable on the hook from one position to a second position, said keeper being freely depressible when in said first position to allow insertion or withdrawal of said link in said side chain and said keeper overlapping the attached side of said link when in said second position whereby said overlapping by the keeper prevents depression of said keeper and means comprising a spring catch for retaining said keeper in said second position.

In witness whereof, I hereunto subscribe my name this 9th day of March, 1929.

FRED W. NILSON.